United States Patent [19]

Suzuki

[11] Patent Number: 5,090,270
[45] Date of Patent: Feb. 25, 1992

[54] CONTROL SYSTEM FOR AUTOMATIC TRANSMISSION

[75] Inventor: Yutaka Suzuki, Atsugi City, Japan
[73] Assignee: Nissan Motor Co., Ltd., Yokohama City, Japan
[21] Appl. No.: 345,255
[22] Filed: May 1, 1989
[30] Foreign Application Priority Data May 12, 1988 [JP] Japan .................. 63-113446

[51] Int. Cl.⁵ .............................................. B60K 41/06
[52] U.S. Cl. ................................... 74/866; 74/867
[58] Field of Search ......................... 74/866, 867, 868

[56] References Cited

U.S. PATENT DOCUMENTS

| | | | |
|---|---|---|---|
| 4,252,148 | 2/1981 | Fochtman et al. | 74/869 X |
| 4,561,528 | 12/1985 | Sugano | 192/0.052 |
| 4,602,529 | 7/1986 | Sugano | 74/869 |
| 4,706,523 | 11/1987 | Nishikawa et al. | 74/867 X |
| 4,733,581 | 3/1988 | Hasegawa et al. | 74/866 X |
| 4,748,870 | 6/1988 | Sugino et al. | 74/866 |
| 4,763,545 | 8/1988 | Shibayama et al. | 74/866 |
| 4,770,066 | 9/1988 | Hayasaki et al. | 74/867 |
| 4,831,899 | 5/1989 | Honig | 74/867 |
| 4,833,946 | 5/1989 | Lemieux | 74/866 X |

FOREIGN PATENT DOCUMENTS 2153907 1/1978 Fed. Rep. of Germany ........ 74/868
55-24223 2/1980 Japan ................................... 74/867

OTHER PUBLICATIONS

1984 Nissan Automatic Transmission Service Manual, pp. 56 & 58.

Primary Examiner—Leslie A. Braun
Assistant Examiner—Benjamin Levi
Attorney, Agent, or Firm—Foley & Lardner

[57] ABSTRACT

A flow restricting structure is defined by a conduit which fluidly connects a friction element and a hydraulic pressure source. A flow control device is incorporated with the flow restricting structure in a manner to control the flow rate of hydraulic fluid from the hydraulic pressure toward the friction element. An electric control unit is employed for controlling the flow control device in a manner to keep the flow rate at a maximum until a given period of time passes following a N-D select. The given period of time is variable in accordance with operation modes of an engine. The electric control unit may be so arranged as to make the flow restricting structure substantially inoperative for a first given period of time following the N-D select and to make the flow restricting structure gradually operative for a second given period of time following the first period of time.

21 Claims, 10 Drawing Sheets

CONTROL SYSTEM FOR AUTOMATIC TRANSMISSION

BACKGROUND OF THE INVENTION

1. Field of the Invention

The present invention relates in general to an automatic transmission suited for use in an automotive vehicle and more particularly to a control system for the automatic transmission, which attenuates N - D select shock.

2. Description of the Prior Art

NISSAN AUTOMATIC TRANSMISSION SERVICE MANUAL published in 1984 discloses a control system for a four forward speed type automatic transmission, which includes a low clutch and a fixed orifice which is disposed in a fluid line which fluidly connects a source of line pressure with the servo chamber of the low clutch. The control system further comprises an accumulator which is operatively connected to the fluid line in a manner to modify the rate at which hydraulic pressure develops in the clutch servo chamber and smooth the engagement characteristics of the clutch during shifting.

Figure 1:
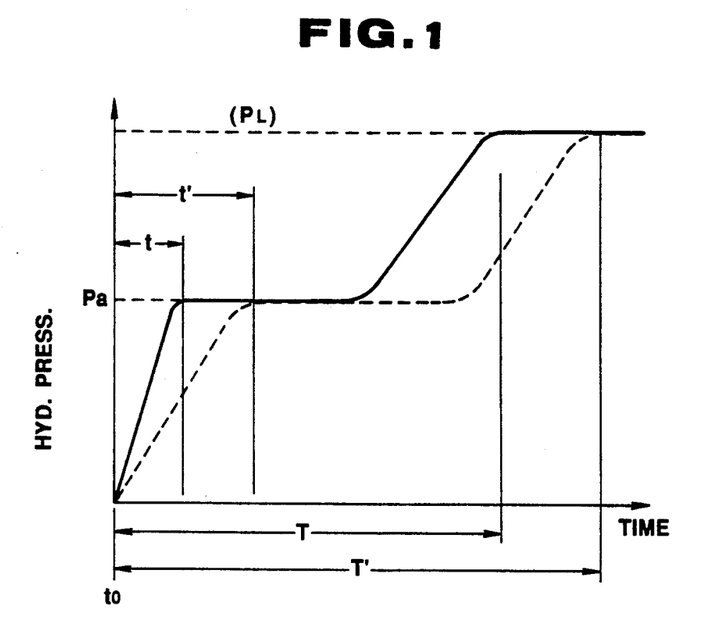
FIG. 1 is a chart which shows, in terms of hydraulic pressure and time, low clutch engagement characteristics of the invention and a prior art.
Figure 2:
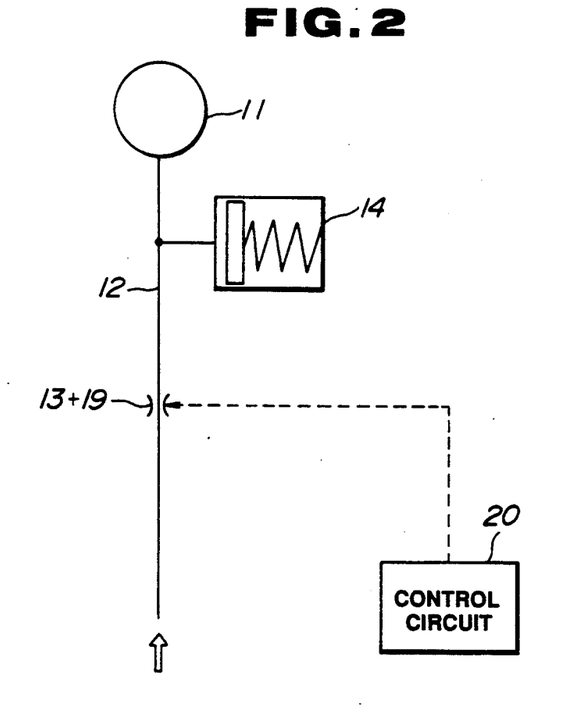
FIG. 2 is a conceptual illustration of the control system of the present invention.

That is, as is seen from the graph of FIG. 1, by the function of the fixed orifice, the raising rate of hydraulic pressure $P_{L/C}$ in the low clutch servo chamber is reduced as is illustrated by a chain line, and due to the function of the accumulator, the hydraulic pressure $P_{L/C}$ in the servo chamber temporarily levels off at pressure Pa before the same increases to become equal to that of the line pressure.

However, due to its inherent construction, the system has the following drawback.

That is, when the transmission is shifted from neutral (N) to D range, a notable N-D select shock tends to occur. To overcome this, it is possible to reduce the size of the fixed orifice and increase the flow resistance provided thereby. However, this causes the charging time of the accumulator to become excessively long and leads to an unacceptably increased N-D time lag. This will be understood from the following.

That is, as is understood from the graph of FIG. 1, when the size of the orifice is reduced, the time t' (viz., the time which does not take part in the shift shock because during which the low clutch is under a loss-stroke) elapsing from the time $t_0$ when N-D select operation takes place to the time when the hydraulic pressure $P_{L/C}$ becomes to assume the level-off value Pa is increased and thus the time T' at which operation of the low clutch is finished is delayed causing the unacceptably increased N-D time lag.

SUMMARY OF THE INVENTION

It is therefore an object of the present invention to provide a control system of an automatic transmission, which is free of the above-mentioned drawback.

According to the present invention, there is provided a control system of an automatic transmission, wherein the rate at which hydraulic pressure is supplied to the servo chamber of the low clutch is rapidly increased for a brief predetermined period following N-D selection.

According to a first aspect of the present invention, there is provided an automatic transmission of a motor vehicle, which comprises a source of hydraulic pressure; a friction element; a conduit fluidly connecting the friction element and the hydraulic pressure source; an accumulator fluidly communicated with the conduit; a first valve fluidly interposed in the conduit at a position upstream of the accumulator; a selectively operable arrangement connected with the first valve for selectively conditioning the first valve to supply hydraulic fluid to the friction element; a fixed orifice interposed in the conduit at a position between the accumulator and the first valve; a one-way valve arranged in parallel with the fixed orifice, the one-way valve being arranged to close when hydraulic fluid is being supplied through the conduit toward the friction element and to open when fluid is being drained from the friction element; a by-pass device bypassing the fixed orifice, the by-pass device being responsive to the selectively operable arrangement for by-passing the fixed orifice for a given period of time following the first valve being conditioned to supply hydraulic fluid to the friction element; and electric control means for varying the given period of time in accordance with operation modes of an engine mounted on the motor vehicle.

According to a second aspect of the present invention, there is provided an automatic transmission of a motor vehicle, which comprises a source of hydraulic pressure; a friction element; a conduit fluidly connecting the friction element and the hydraulic pressure source; an accumulator fluidly communicated with the conduit; a first valve fluidly interposed in the conduit at a position upstream of the accumulator; a selectively operable arrangement connected with the first valve for selectively conditioning the first valve to supply hydraulic fluid to the friction element; a flow restricting means defined by the conduit at a position between the accumulator and the first valve; a one-way valve arranged in parallel with the flow restricting means of the conduit, the one-way valve being arranged to close when hydraulic fluid is being supplied through the conduit toward the friction element and to open when fluid is being drained from the friction element; and a flow control device incorporated with the flow restricting means, the flow control device being responsive to the selectively operable arrangement to control flow of hydraulic fluid from the hydraulic pressure source toward the friction element; and electric control means for controlling the flow control device in a manner to make the flow restricting means substantially inoperative for a first given period of time following the first valve being conditioned to supply hydraulic fluid to the friction element and to make the flow restricting means gradually operative for a second given period time following the first given period of time.

BRIEF DESCRIPTION OF THE DRAWINGS

Other objects and advantages of the present invention will become apparent from the following description when, taken in conjunction with the accompanying drawings, in which:

FIG. 4' is an interrupt routine of the operations of FIG. 4;

FIG. 8' is an interrupt routine of the operations of FIG. 8;

DETAILED DESCRIPTION OF THE INVENTION

Figure 3:
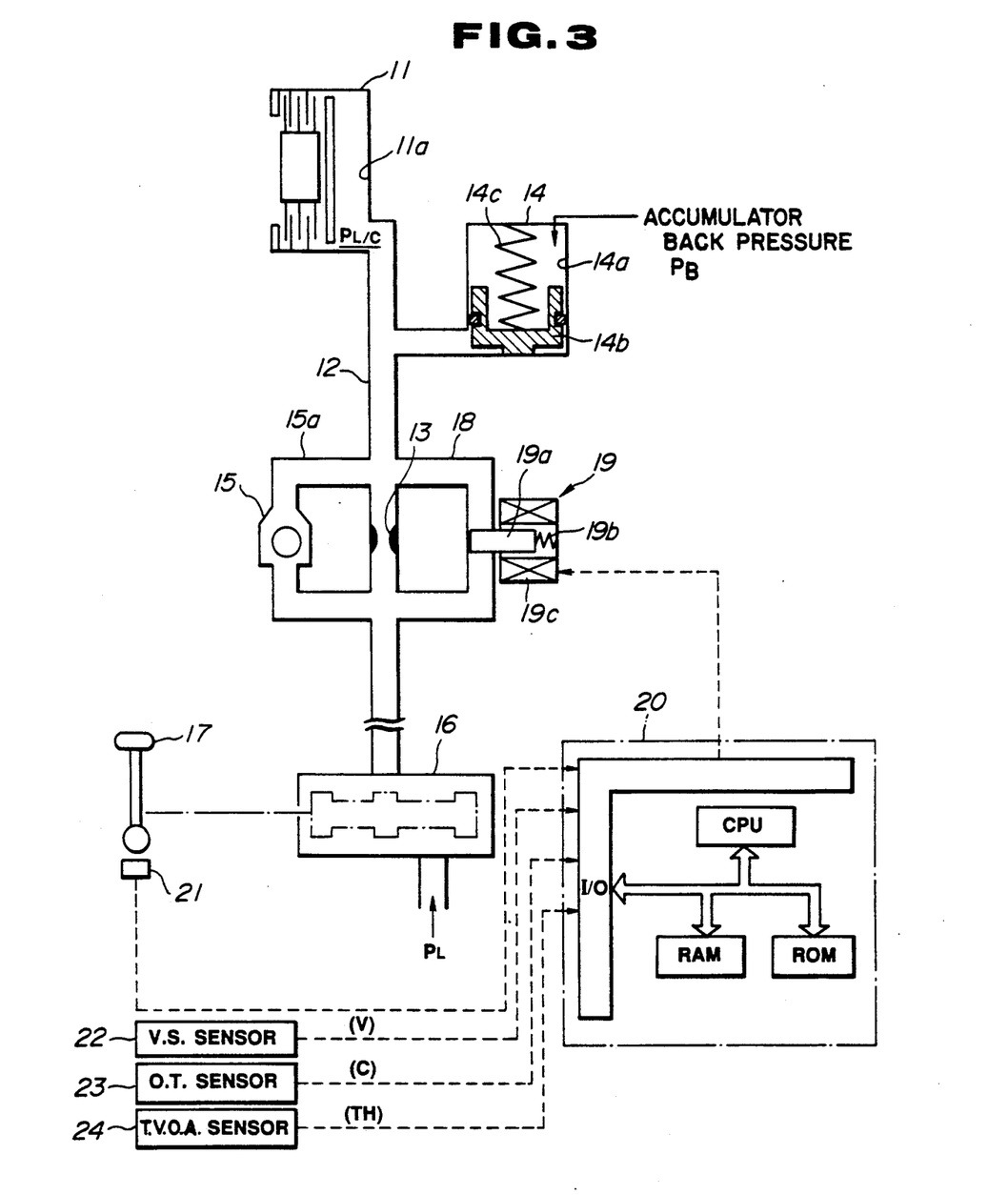
FIG. 3 is a schematic view of a first embodiment of the control system of the present invention.

Referring to FIG. 3, there is shown a portion of a hydraulic control system of a first embodiment of the present invention, which is designed to control the operation of the above-mentioned type four speed automatic transmission. This arrangement includes a low clutch 11 which is supplied with line pressure via a conduit 12. A fixed orifice 13 is disposed in the conduit 12 between the low clutch 11 and a source of line pressure (not shown). An accumulator 14 is arranged to communicate with the conduit 12 at a location defined between the clutch 11 and the fixed orifice 13.

In the illustrated arrangement, the accumulator 14, in this instance, is shown to include a bore 14a and a piston 14b reciprocatively disposed therein. A spring 14c is arranged to bias the piston 14b toward a position wherein the volume of variable volume chamber defined in the bore 14a by the piston, is minimized. It will be appreciated that the construction and arrangement of the accumulator is not limited to this design.

A by-pass passage 18 is arranged to fluidly communicate with the conduit 12 at points upstream and downstream of the orifice 13.

An ON/OFF type solenoid valve 19 is disposed in the by-pass passage 18. The valve 19 is operatively connected with a control circuit 20 which includes a microprocessor.

The microprocessor receives information data from a shift lever position detection sensor 21, a vehicle speed sensor 22, a transmission oil temperature sensor 23 and a throttle valve opening angle sensor 24.

A ball valve 15 is arranged in a by-pass passage 15a which bypasses the fixed orifice 13. This device is arranged to close when hydraulic fluid is being supplied through conduit 12 toward the clutch 11 and to open when fluid is being drained from the clutch 11.

A manual selector valve 16 is disposed in the conduit 12 between the orifice 13 and the source of line pressure. This valve 16 is operatively connected with the shift lever 17 and is arranged to supply line pressure into the conduit 12 when the shift lever 17 is moved into the D-range position.

As will be fully appreciated, the above described arrangement is incorporated in a control system, which further includes a high clutch, a rear clutch, a low and reverse brake, 1-2, 2-3 and 3-4 shift valves, a variable capacity pump, a line pressure regulator valve, a governor valve, a throttle valve and the like, and which can be conditioned to produce first, second and third forward gear ratios in D range, fourth in OD (over-drive) range and to selectively produce one of first, second and third forward gear ratios by appropriately setting the shift lever 17 to the I, II and III positions respectively.

For further information concerning the construction and operation of the system to which the present invention is applied, reference can be had to U.S. Pat. No. 4,561,528 issued in the name of Sugano Dec. 31, 1985 and U.S. Pat. No. 4,602,529 issued on July 29, 1986 also in the name of Sugano.

The operation of the above-described arrangement is such that when the shift lever 17 is moved from the N position to the D one, the shift lever position detection sensor 21 detects the change in position and outputs a signal indicative of the currently selected one of the two ranges. This information is fed to the I/O of the microprocessor which in turn energizes the solenoid 19c of the solenoid valve 19 and induces the plunger 19a which has closed the by-pass passage 18, to be withdrawn or moved in a manner which renders the passage 18 open and therefore operative to by-pass the fixed orifice 13.

At the same time, line pressure is supplied into the conduit 12 through the manual selector valve 16. Under these conditions, this pressure is unrestrictedly supplied into the servo chamber 11a of the low clutch 11 and into the chamber 14a of the accumulator 14.

The rate at which pressure develops in the chamber 11a of the low clutch 11 is shown in FIG. 1. It will be noted that in this figure, the characteristics shown in solid line are those produced by the instant embodiment while the solenoid is being energized while those shown in chain line are those produced when the by-pass passage 18 is constantly closed and communication between the servo chamber 11a and the source of line pressure is provided exclusively by the fixed orifice 13. That is, the characteristics shown in the chain line are those provided by the afore-mentioned NISSAN SERVICE MANUAL.

As will be noted with the present invention by by-passing the fixed orifice 13, it is possible to rapidly raise the pressure in the chambers 11a and 14a to the level Pa at which the piston 14b of the accumulator 14 begins to move against the bias of the spring 14c. During the movement of the piston 14b, the pressure development temporarily levels off at pressure Pa until the accumulator 14 is charged. Following this, the pressure again increases to become equal to that of the line pressure.

As is understood from the chart of FIG. 1, while the solenoid 19c is kept open rendering the by-pass passage 18 operational, the time at which the pressure reaches Pa in the servo chamber 11a of the low clutch 11 is reduced from time t' to time t while the time required for the line pressure level to be reached is reduced from time T' to time T.

In the first embodiment, the following measure is further employed.

That is, the operation of the solenoid valve 19 is controlled in accordance with informations from the vehicle speed sensor 22, the transmission oil sensor 23 and the throttle valve opening angle sensor 24 as well as the information from the shift lever position detection sensor 21. More specifically, the period $T_0$ for which the solenoid valve 19 is kept opened following N-D selection is varied in accordance with the informations from the sensors 22, 23 and 24. With this measure, the solenoid valve 19 closes assuredly the by-pass passage 18 when the hydraulic pressure $P_{L/C}$ reaches the level-off value Pa.

As is known, the engagement characteristics of transmission friction elements vary notably with temperature of the transmission oil. That is, with temperature decrease, the viscosity of the oil is increased causing increase of the time t' (see FIG. 1). Under this condition, it is necessary to prolong the period $T_0$. When N-D selection is carried out with the accelerator pedal depressed (viz., with the engine considerably loaded), the level-off value Pa is kept high due to increase of back pressure $P_B$ of the accumulator 14, which tends to increase the time t'. Thus, in this condition, it is necessary to prolong the period $T_0$ as compared with that required when the selection is carried out with the accelerator pedal released (viz., the engine not loaded).

The information signals from the sensors 21, 22, 23 and 24 are fed to the microprocessor of the control circuit 20 in which the signals are treated to produce instruction signals for controlling the solenoid valve 19 in ON-OFF manner.

Figure 4:
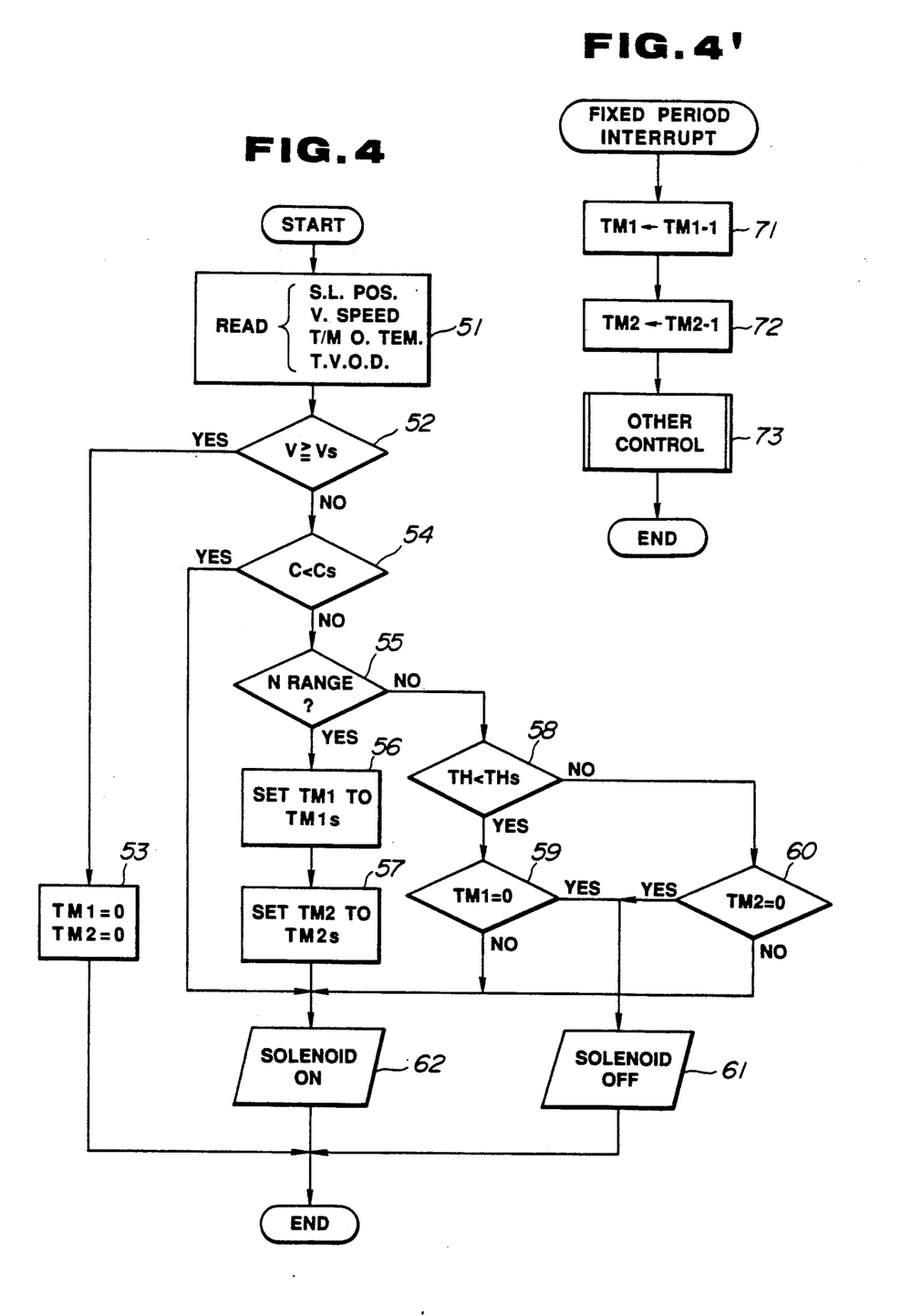
FIG. 4 is a flowchart showing the operations which characterize the control carried out by the control system of the first embodiment.

FIG. 4 shows in flowchart form the operations which are performed in the CPU of the microprocessor in order to ensure the above-mentioned control. As shown, the first step 51 of the routine is such as to read the outputs of the sensors 21, 22, 23 and 24 and to set this data in a manner suitable for further processing. At step 52, a judgement as to whether the vehicle speed V is higher than a predetermined small value $V_s$ or not (viz., whether the vehicle is under moving or not) is carried out. If YES (viz., the vehicle is moving), the program flows to step 53 wherein timers TM1 and TM2 are reset to their maximum counts at time TM1 and TM2 equal to $\phi$. As will be understood as the description proceeds, these timers TM1 and TM2 are used for controlling the time at which the solenoid valve 19 is turned to close the by-pass passage 18 upon N-D selection with the engine loaded or non-loaded.

Figure 5:
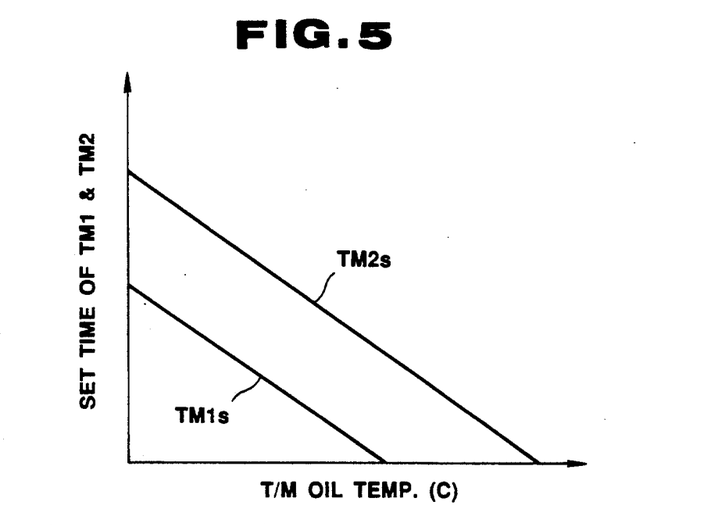
FIG. 5 is a graph showing the relationship between oil temperature and set time provided by timer, in the first embodiment.

If NO (viz., the vehicle is at a standstill) at step 52, the program flows to step 54 wherein a judgement as to whether the transmission oil temperature C is lower than a predetermined very low level $C_s$ or not is carried out. If YES (viz., the temperature C is very low and thus viscosity of the oil is considerable causing a marked interruption of the fixed orifice 13 against the oil), the program flows to step 62. At this step, a command to energize the solenoid 19c if the solenoid valve 19 is issued for opening the by-pass passage 18. If NO at step 54 (viz., the temperature C is not very low), the program flows to step 55 to determine if the transmission is in neutral (N) range or not. If YES (viz., the transmission is in N range), the program flows to steps 56 and 57 wherein predetermined periods $TM1_s$ and $TM2_s$ corresponding to the existing oil temperature C are looked up from the table of FIG. 5 and these periods are set in the timers TM1 and TM2. Following this, the program flows to step 62 for opening the solenoid valve 19. It is to be noted that the periods $TM1_s$ and $TM2_s$ correspond to the period taken, with the engine non-loaded or loaded, from the time when a N-D selection of the shift lever 17 is effected to the time when the piston 14b of the accumulator 14 begins to move against the spring 14c. Accordingly, the period $TM2_s$ provided when the engine is loaded is made longer than the period $TM1_s$ provided with the engine is non-loaded, and each period $TM1_s$ or $TM2_s$ is made gradually decreased with increase of the oil temperature.

If NO (viz., the transmission is not in N range) at step 55, the program flows to step 58 to determine if the throttle valve opening degree TH is smaller than a predetermined small value $TH_s$ or not, that is, if the engine is non-loaded or loaded. If YES (viz., the engine is non-loaded), the program flows to step 59 to determine if TM1 is zero or not. If NO (viz., the engine is loaded) at step 58, the program flows to step 60 to determine if TM2 is zero or not.

It is to be noted that the timers TM1 and TM2 are of a so-called "soft" timer which is arranged to count down to zero from a predetermined number. The rate at which these timers count down is controlled by an interrupt routine of the nature shown in FIG. 4'. As will be appreciated this routine is arranged to be run at predetermined time intervals (50 to 100 ms by way of example only).

Each time this routine is run, the count of timer TM1 or TM2 is decremented. However, when the transmission is in N range, the timers TM1 and TM2 keep the values $TM1_s$ and $TM2_s$ respectively due to operation at steps 56 and 57. When the transmission is shifted to the other range, for example, D range, the timers TM1 and TM2 start to count down from $TM1_s$ and $TM2_s$ to zero. Accordingly, each step 59 or 60 serves to check if the period $TM1_s$ or $TM2_s$ has passed or not from the time when the transmission was shifted from N range to the other range (viz., D range). Thus, if NO (viz., the period $TM1_s$ or $TM2_s$ has not passed) at step 59 or 60, the program flows to step 62 keeping the solenoid valve 19 open. If YES (viz., the period has passed) at the step, the program flows to step 61 to stop energization of the solenoid 19c of the solenoid valve 19 shutting off the by-pass passage 18.

Figure 6:
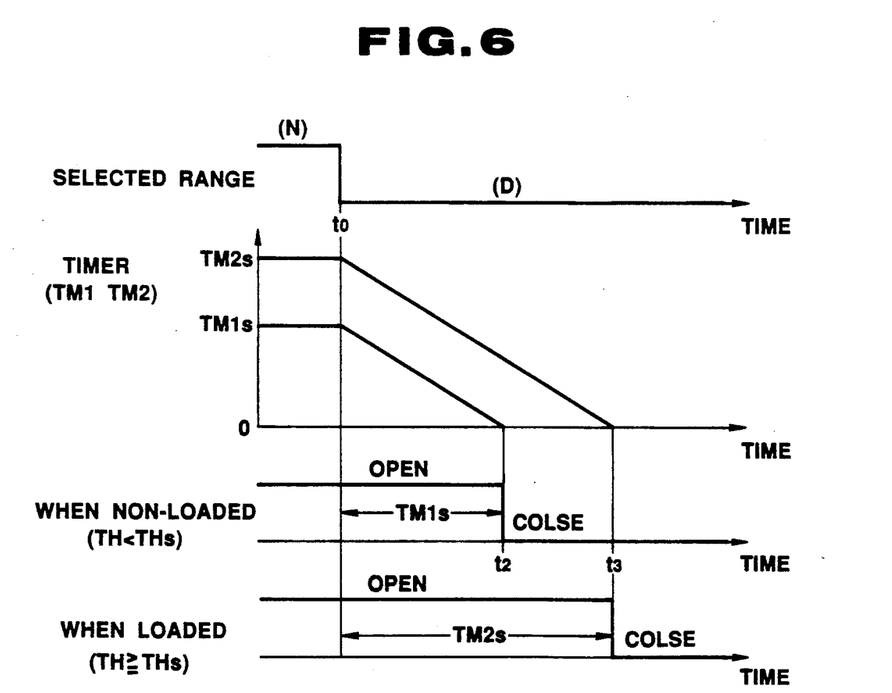
FIG. 6 is a timing chart showing control characteristics which form a vital part of the first embodiment.

If the N-D selection is quickly carried out, that is, within a very short time $t_o$, as is understood from the timing chart of FIG. 6, the following operation is carried out.

That is, when the transmission is in N range, the timers TM1 and TM2 are set to the values $TM1_s$ and $TM2_s$ in accordance with the transmission oil temperature C and the solenoid valve 19 is kept open. From the time when a N-D selection has been carried out, the values $TM1_s$ and $TM2_s$ of the timers TM1 and TM2 begin to reduce. If the N-D selection is made with the engine non-loaded, the solenoid valve 19 closes the by-pass passage 18 at just the time $t_2$ when the timer TM1 shows zero, while, if the N-D selection is made with the engine loaded, the solenoid valve 19 closes the passage 18 at just the time $t_3$ when the timer TM2 shows zero. Accordingly, in case of the engine being non-loaded, within the period $TM1_s$ following N-D selection, the hydraulic pressure $P_{L/C}$ in the servo chamber 11a of the low clutch 11 and in the bore 14a of the accumulator 14 is rapidly increased to the level Pa, due to open condition of the solenoid valve 19, at which the piston 14b of the accumulator 14 begins to move. Following this, the solenoid valve 19 is turned to close the by-pass passage 18 reestablishing the fixed orifice 13. Thereafter, the hydraulic pressure $P_{L/C}$ is subjected to a level-off condition and then slowly increased to the level of the line pressure $P_L$. It is to be noted that during movement of the piston 14b of the accumulator 14, the pressure development temporarily levels off at pressure Pa until the accumulator 14 is charged. While, in case of the engine being loaded, within the period $TM2_s$ following N-D selection, the hydraulic pressure $P_{L/C}$ is rapidly increased to the level Pa due to open condition of the solenoid valve 19 and thereafter subjected to a level-off condition and thereafter slowly increased to the level of the line pressure $P_L$.

With the above-described arrangement of the first embodiment, the following advantages are derived.

1. As indicated in FIG. 1, while the solenoid valve 19 is kept open rendering the by-pass passage 18 operational, the time at which the hydraulic pressure reaches Pa in the servo chamber 11a of the clutch 11 is reduced from time t′ to t; while the time required for line pressure level to be reached is reduced from time T′ to time T. That is, the undesirable N-D time lag is reduced.

2. By selectively using the set period $TM1_s$ or $TM2_s$ based on whether the engine is non-loaded and loaded, the period for which the solenoid valve 19 is kept open following a N-D selection is changed. Thus, even when, due to changing of loaded condition of the engine, the level-off value Pa (see FIG. 1) is varied, the above-mentioned set period can be dealt with the variation of the value Pa. Thus, irrespective of the loaded condition of the engine, the solenoid valve 19 can be kept open precisely for the period from the time when a N-D selection is effected to the time when the piston 14b of the accumulator 14 begins to move. Thus, the time required for practically engaging the low clutch 11 is reduced without increasing undesired select shock.

3. As is seen from the graph of FIG. 5, the set periods $TM1_s$ and $TM2_s$ are varied in accordance with the temperature of oil temperature. Thus, even when, due to change of the oil temperature, the time t′ (see FIG. 1) at which the hydraulic pressure reaches Pa in the servo chamber 11a of the clutch 11 is changed, the set periods can be dealt with the variation of the time t′. Thus, irrespective of change of oil temperature, the solenoid valve 19 can be kept open precisely for the period from the time at which N-D selection is effected to the time at which the piston 14b of the accumulator 14 begins to move. Thus, the time required for practically engaging the low clutch 11 can be reduced without increasing undesired select shock.

4. As will be seen from the timing chart of FIG. 6, even when the solenoid valve 19 is closed (for the time from the time $t_2$ to the time $t_3$) upon expiration of the set period $TM1_s$ after a N-D selection under non-loaded condition of the engine, the solenoid valve 19 is reopened if the engine becomes loaded before expiration of the other set period $TM2_s$. This reopening of the solenoid valve 19 is achieved by a looped flow which includes the steps 58, 60 and 62 (see FIG. 4). Also in this case, the solenoid valve 19 becomes opened before the time when the piston 14b of the accumulator 14 begins to move. Thus, the time required for practically engaging the low clutch 11 can be reduced.

Although the above description is directed to the control for N-D selection, the present invention is applicable to a control for N-R (reverse) selection. In this case, similar control is applied to a hydraulically operated friction mechanism which induces a reverse mode of the transmission.

Although "soft" timers are used in the above-mentioned arrangement, mechanical timers which operate in response to movement of the shift lever 17 are also usable for controlling operation of the solenoid valve 19.

Figure 7:
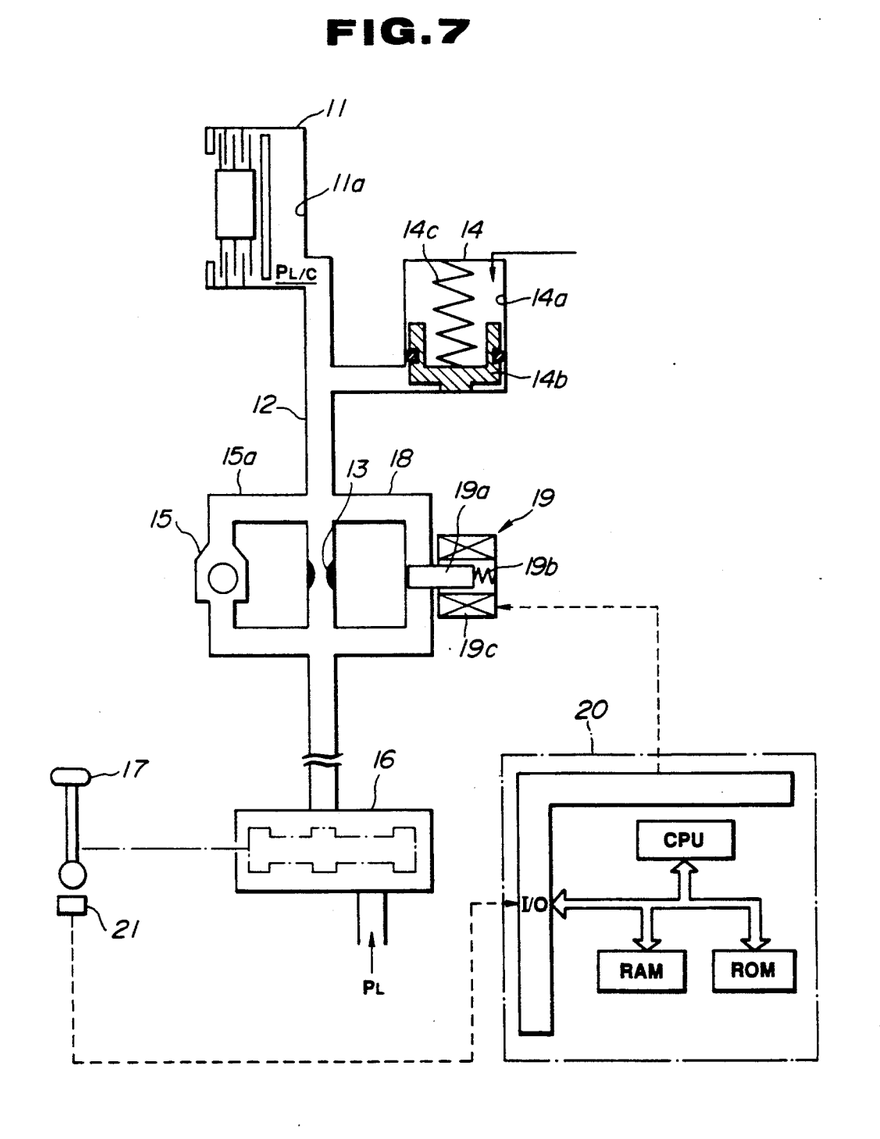
FIG. 7 is a view similar to FIG. 3, but showing a second embodiment of the present invention.

Referring to FIG. 7, there is shown a portion of a hydraulic control system of a second embodiment of the present invention. As will be understood when comparing FIG. 7 with the above-mentioned FIG. 3 of in construction to the first embodiment except for several portions.

Thus, the following explanation will be directed to only the different portions.

That is, the solenoid valve 19 is of a so-called "electromagnetic proportional" type which can continuously vary the sectional area of the by-pass passage 18. Furthermore, in this embodiment, the microprocessor of the control unit 20 uses only information data from the shift lever position detection sensor 21.

Figure 8:
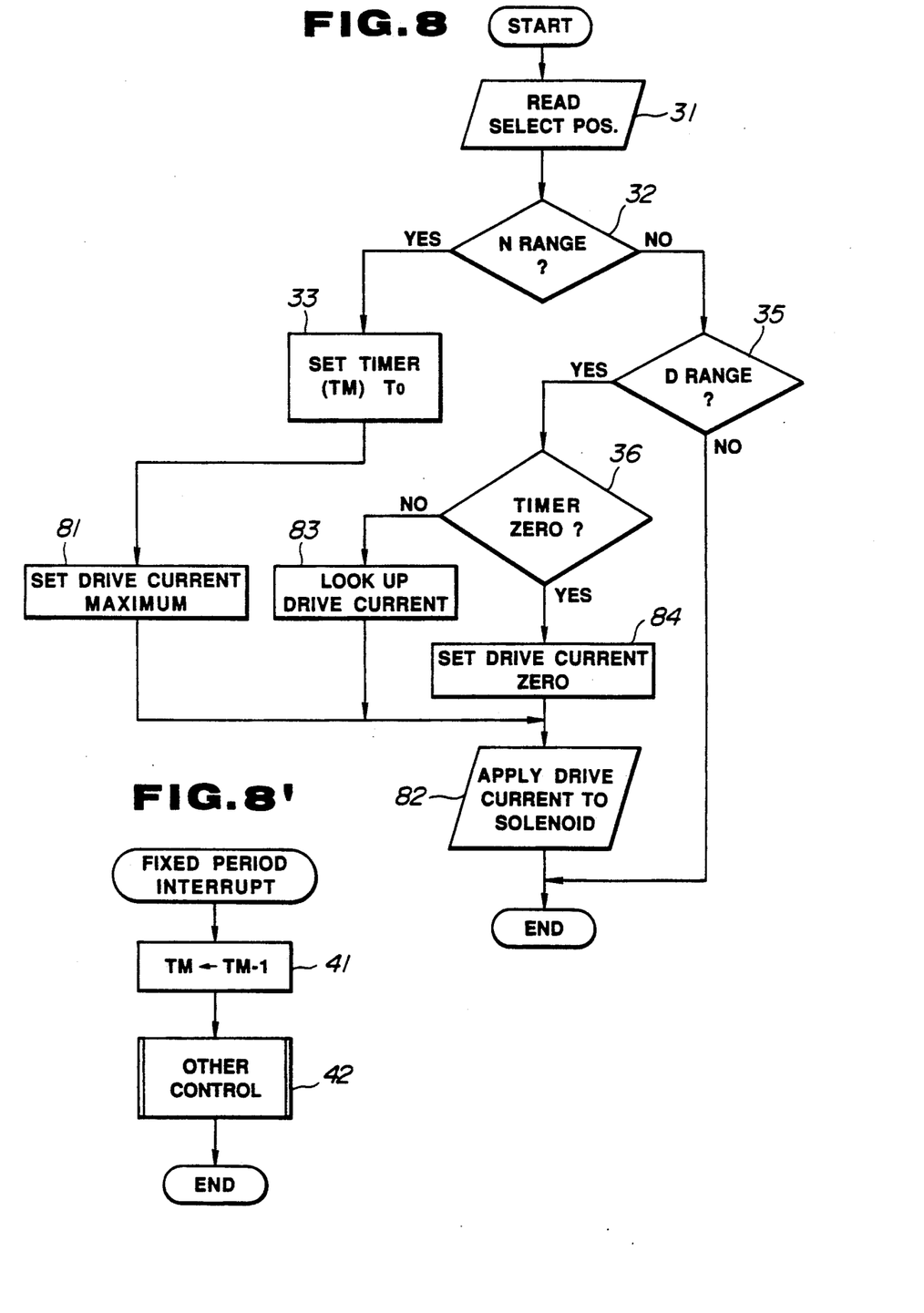
FIG. 8 is a flowchart showing operations which characterize the control carried out by a control system of the second embodiment.

The operations which are performed in the control unit 20 are shown in the flowcharts in FIGS. 8 and 8′.

Figure 9:
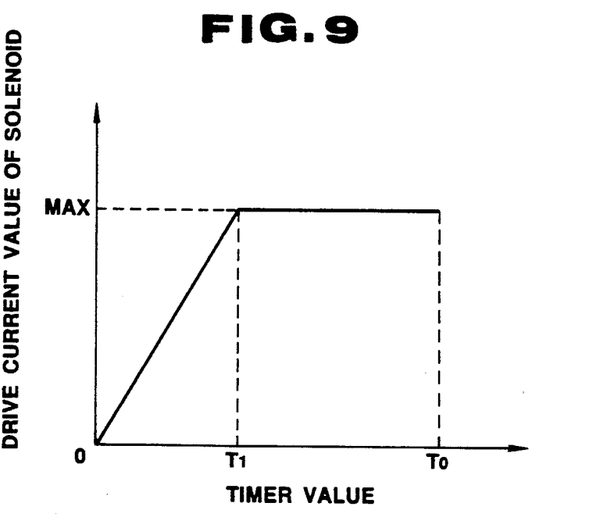
FIG. 9 is a graph showing the relationship between a timer value and a current applied to a solenoid, in the second embodiment.

As shown in the flowchart of FIG. 8, the first step 31 of the routine is to read the output of the shift lever position detection sensor 21. At step 32, a judgement as to whether the transmission is in N range or not is carried out. If YES (viz., the transmission is in N range), the program flows to step 33 wherein a timer TM is reset to its maximum count $T_0$. Thereafter, the program flows to step 81 to set a drive current for the solenoid valve 19 at a maximum value and then the program flows to step 82 to apply the solenoid 19c of the valve 19 with the maximum drive current for making the valve 19 fully open. If NO (viz., the transmission is not in N range) at step 32, the program flows to step 35 in order to determine if the transmission is in D range or not. If YES (viz., the transmission is in D range), the program flows to step 36 to determine if the value of the timer TM is zero or not. If NO (viz., the timer value is not zero), the program flows to step 83 to look up, from a table data of FIG. 9, a drive current corresponding to the timer value. That is, until the time when the step 36 judges that the timer value is zero, that is, until the predetermined period $T_0$ passes, the looking up for the current value is repeated. The current value thus looked up is practically applied to the solenoid 19c at step 82, so that the solenoid valve 19 is fully open at an initial stage following a N-D selection and thereafter (viz., after a time ($T_0$-$T_1$) passes, see FIG. 9) gradually closed. If YES (viz., the timer value is zero) at step 36, the program flows to step 84 to set a drive current for the solenoid valve 19 to zero and thus no drive current is applied to the solenoid 19c of the valve 19 thereby making the valve 19 fully closed. That is, when the predetermined period $T_0$ passes following a N-D selection, the solenoid valve 19 is fully closed.

Figure 10:
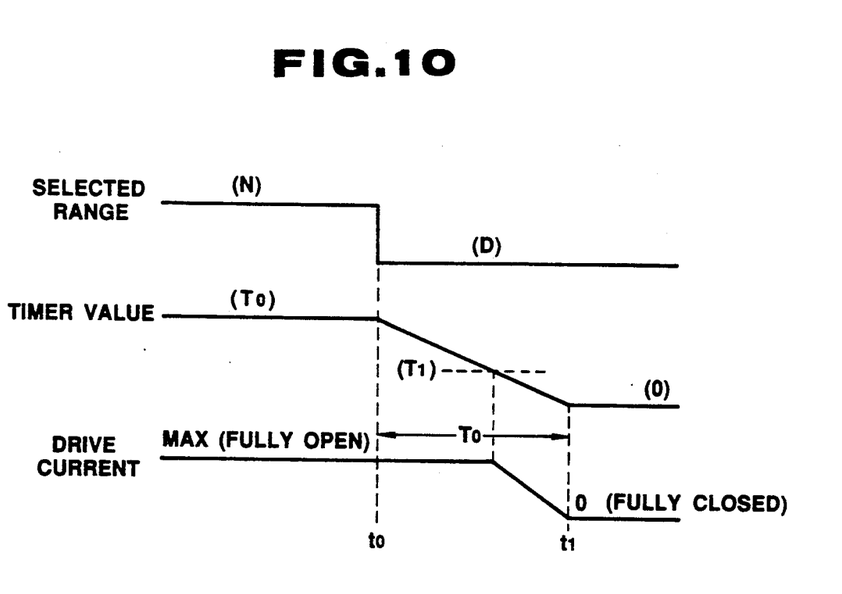
FIG. 10 is a timing chart showing control characteristics which form a vital part of the second embodiment.

Thus, as is understood from the timing chart of FIG. 10, in the second embodiment, from the time when the timer TM shows the value $T_1$, the solenoid valve 19 which has been fully opened is gradually closed, and at the time $t_1$, the solenoid valve 19 is fully closed.

Figure 11:
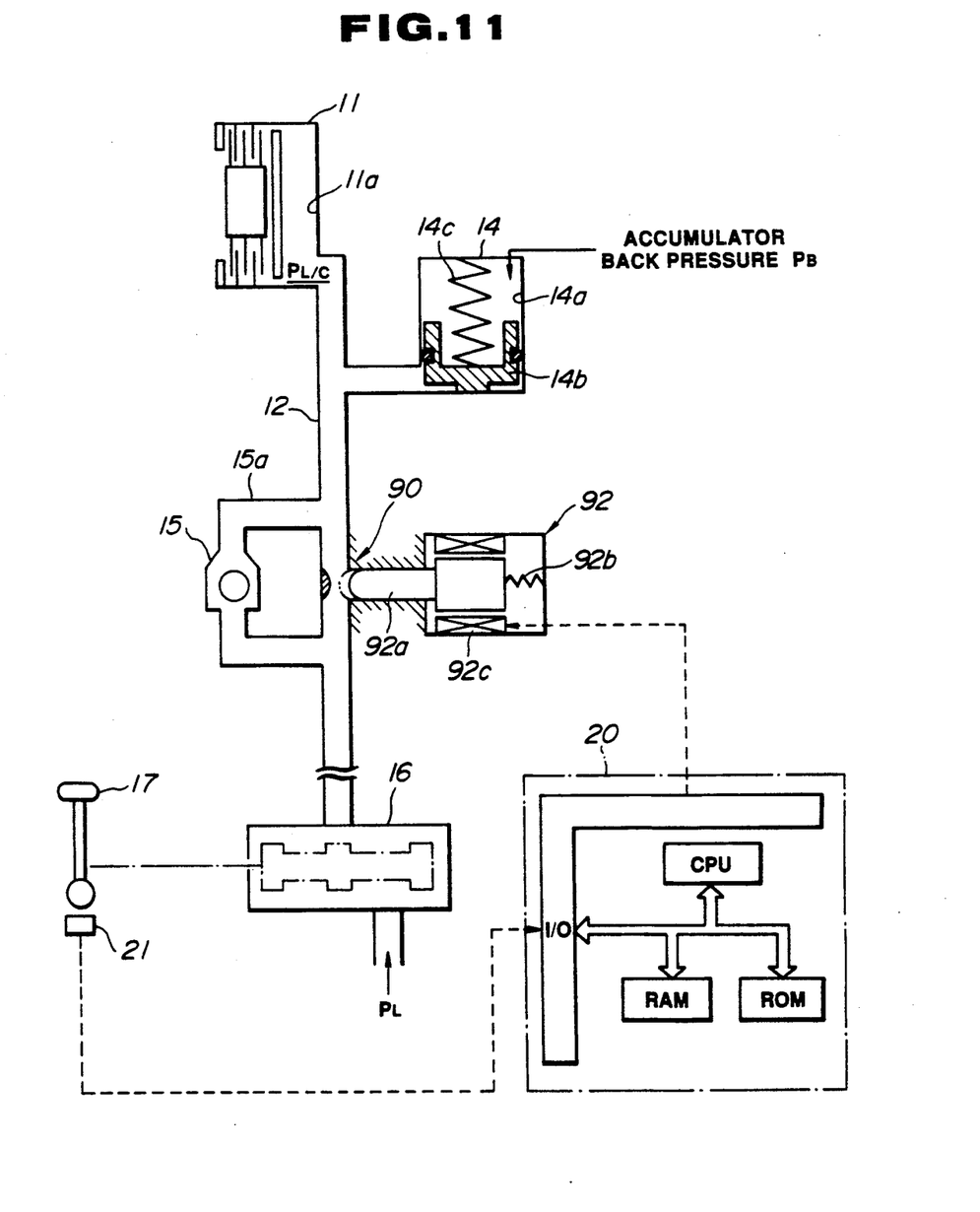
FIG. 11 is a view similar to FIG. 3, but showing a third embodiment of the present invention.

Referring to FIG. 11, there is shown a portion of a hydraulic control system of a third embodiment of the present invention. In this third embodiment, a so-called "variable orifice" 90 is employed for achieving the above-mentioned advantageous operation.

The variable orifice 90 is actuated by an electric actuator 92 which comprises a plunger 92a having a domed head projectable into the conduit 12, a biasing spring 92b biasing the plunger 92a toward the conduit 12 and a solenoid 92c attracting the plunger when electrically energized. That is, when the solenoid 92c is deenergized, the plunger 92a is moved, by the spring 92b, to its leftmost position as shown by a phantom line wherein a flow restricting function identical to that of the above-mentioned fixed orifice 13 (see FIG. 7) is achieved. The actuator 92 is of an electromagnetic proportional type, so that a rightwardly moved distance of the plunger 92a is proportional to the magnitude of drive current practically applied to the solenoid 92c.

Figure 12:
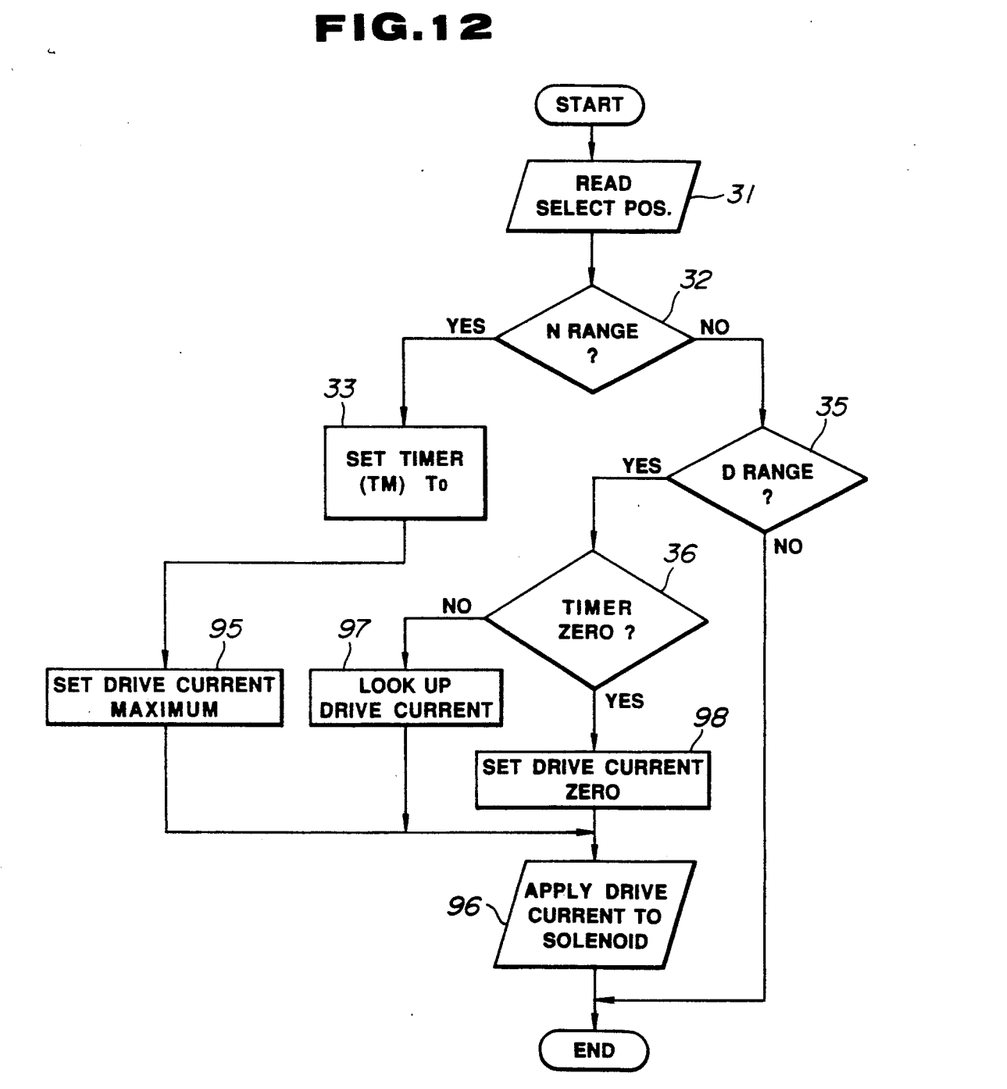
FIG. 12 is a flowchart showing operations which characterize the control carried out by a control system of the third embodiment.

The operations which are performed in the control unit 20 are shown in the flowcharts in FIG. 12. As shown, the steps carried out in the microprocessor of the control unit 20 is substantially the same as those of the above-mentioned second embodiment. It is to be noted that the steps 95, 97, 98 and 96 correspond respectively to the steps 81, 83, 84 and 82 of the second embodiment.

Figure 13:
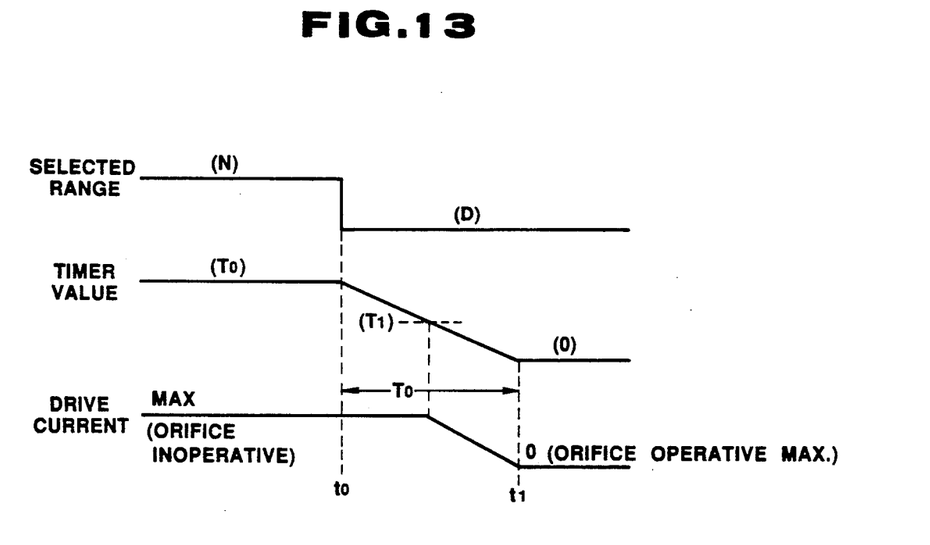
FIG. 13 is a timing chart showing control characteristics which form a vital part of the third embodiment.

Thus, as is understood from the timing chart of FIG. 13, the operation of the third embodiment is substantially the same as that of the second embodiment. That is, from the time when the timer TM shows the value $T_1$, the variable orifice 90 which has been fully opened is gradually closed, and at the time $t_1$, the variable orifice 90 shows its minimum sectional area.

What is claimed is:

1. An automatic transmission of a motor vehicle, comprising:
    a source of hydraulic pressure,
    a friction element;
    a conduit fluidly connecting said friction element and said hydraulic pressure source;
    an accumulator fluidly communicated with said conduit;
    a first valve fluidly interposed in said conduit at a position upstream of said accumulator;
    a selectively operable arrangement connected with said first valve for selectively conditioning said first valve to supply hydraulic fluid to said friction element;
    a fixed orifice interposed in said conduit at a position between said accumulator and said first valve;
    a one-way valve arranged in parallel with said fixed orifice, said one-way valve being arranged to close when hydraulic fluid is being supplied through said conduit toward said friction element and to open when fluid is being drained from said friction element;
    a by-pass device bypassing said fixed orifice, said by-pass device being responsive to said selectively operable arrangement for by-passing said fixed orifice for a given period of time following said first valve being conditioned to supply hydraulic fluid to said friction element; and
    electric control means for varying said given period of time in accordance with operation modes of an engine mounted on said motor vehicle.

2. An automatic transmission as claimed in claim 1, in which said by-pass device comprises:
    a by-pass passage by-passing said fixed orifice; and
    a solenoid valve which is arranged to fully open said by-pass passage when electrically energized and to fully close said by-pass passage when deenergized.

3. An automatic transmission as claimed in claim 2, in which said solenoid valve includes:
    a plunger projectable into said by-pass passage;
    a biasing spring biasing said plunger toward said by-pass passage; and
    a solenoid attracting said plunger against said spring when electrically energized.

4. An automatic transmission as claimed in claim 3, in which said electric control means varies said given period of time in accordance with an information as to whether said engine of the motor vehicle is loaded or unloaded.

5. An automatic transmission as claimed in claim 4, in which said electric control means is so arranged that the given period of time provided when the engine is loaded is made longer than that provided when the engine is non-loaded.

6. An automatic transmission as claimed in claim 5, in which said electric control means comprises a microprocessor which receives information data from a first sensor by which the position of a shift lever of the transmission is detected, a second sensor by which a speed of the motor vehicle is detected, a third sensor by which a temperature of oil of the transmission and a fourth sensor by which an opening angle of a throttle valve of the engine is detected.

7. An automatic transmission as claimed in claim 6, in which said electric control means is so arranged that the given period of time is gradually decreased with an increase of temperature of the transmission oil.

8. An automatic transmission of a motor vehicle, comprising:
    a source of hydraulic pressure;
    a friction element;
    a conduit fluidly connecting said friction element and said hydraulic pressure source;
    an accumulator fluidly communicated with said conduit;
    a first valve fluidly interposed in said conduit at a position upstream of said accumulator;
    a selectively operable arrangement connected with said first valve for selectively conditioning said first valve to supply hydraulic fluid to said friction element;
    a flow restricting means defined by said conduit at a position between said accumulator and said first valve;
    a one-way valve arranged in parallel with said flow restricting means of said conduit, said one-way valve being arranged to close when hydraulic fluid is being supplied through said conduit toward said friction element and to open when fluid is being drained from said friction element; and
    a flow control device incorporated with said flow restricting means, said flow control device being responsive to said selectively operable arrangement to control flow of hydraulic fluid from said hydraulic pressure source toward said friction element; and
    electric control means for controlling said flow control device in a manner to make said flow restricting means substantially inoperative for a first given period of time following said first valve being conditioned to supply hydraulic fluid to said friction element and to make said flow restricting means gradually operative for a second given period of time following said first given period of time.

9. An automatic transmission as claimed in claim 8, in which said electric control means is so arranged that upon expiration of said second given period of time, said flow restricting means becomes completely operative.

10. An automatic transmission as claimed in claim 9, in which said flow restricting means comprises a fixed orifice which is operatively disposed in said conduit, and in which said flow control device comprises a bypass passage bypassing said fixed orifice and a solenoid valve of an electromagnetic proportional type which continuously varies the sectional area of said bypass passage in accordance with a magnitude of electric current applied thereto.

11. An automatic transmission as claimed in claim 10, in which said solenoid valve comprises a plunger projectable into said by-pass passage, a biasing spring biasing said plunger toward said by-pass passage and a solenoid attracting said plunger against said biasing spring upon electric energization thereof.

12. An automatic transmission as claimed in claim 11, in which said electric control means receives information data from a sensor by which the position of a shift lever of the transmission is detected.

13. An automatic transmission as claimed in claim 12, in which said electric control means is so arranged as to supply said solenoid with a maximum current until said first given period of time expires and to gradually reduce the magnitude of current following the expiration of the first given period of time.

14. An automatic transmission as claimed in claim 13, in which said electric control means is so arranged as to reduce the magnitude of current to zero upon expiration of said second period of time.

15. An automatic transmission as claimed in claim 14, in which the distance by which said plunger of the solenoid valve is moved against said biasing spring is proportional to the magnitude of current applied to said solenoid.

16. An automatic transmission as claimed in claim 9, in which said flow restricting means comprises a given portion of said conduit, and in which said flow control device comprises a solenoid valve of electromagnetic proportional type which continuously varies the sectional area of said given portion of said conduit in accordance with a magnitude of electric current applied thereto.

17. An automatic transmission as claimed in claim 16, in which said solenoid valve comprises a plunger projectable into said given portion of the conduit, a biasing spring biasing said plunger toward said given portion and a solenoid attracting said plunger against said biasing spring upon electric energization thereof.

18. An automatic transmission as claimed in claim 17, in which said electric control means receives information data from a sensor by which the position of a shift lever of the transmission is detected.

19. An automatic transmission as claimed in claim 18, in which said electric control means is so arranged as to supply said solenoid with a maximum current until said first given period of time expires and to gradually reduce the magnitude of current following the expiration of the first given period of time.

20. An automatic transmission as claimed in claim 19, in which said electric control means is so arranged as to reduce the magnitude of current to zero upon expiration of said second period of time.

21. An automatic transmission as claimed in claim 20, in which the distance by which said plunger of the solenoid valve is moved against said biasing spring is proportional to the magnitude of current applied to said solenoid.

* * * * *